US011931872B2

(12) United States Patent
Asplund

(10) Patent No.: US 11,931,872 B2
(45) Date of Patent: Mar. 19, 2024

(54) BOLT TENSIONING TOOL

(71) Applicant: ATLAS COPCO INDUSTRIAL TECHNIQUE AB, Stockholm (SE)

(72) Inventor: Daniel Asplund, Huddinge (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 388 days.

(21) Appl. No.: 17/438,378

(22) PCT Filed: Feb. 20, 2020

(86) PCT No.: PCT/EP2020/054549

§ 371 (c)(1), (2) Date: Sep. 10, 2021

(87) PCT Pub. No.: WO2020/182442

PCT Pub. Date: Sep. 17, 2020

(65) Prior Publication Data

US 2022/0152803 A1 May 19, 2022

(30) Foreign Application Priority Data

Mar. 11, 2019 (SE) ...................................... 1930085

(51) Int. Cl.
*B25B 29/02* (2006.01)

(52) U.S. Cl.
CPC .................................... *B25B 29/02* (2013.01)

(58) Field of Classification Search
CPC ............................... B25B 29/02; B23P 19/067
See application file for complete search history.

(56) References Cited

U.S. PATENT DOCUMENTS 2,820,382 A 1/1958 Smith
4,815,344 A * 3/1989 Nemec .................... B25B 23/14 976/DIG. 175
6,810,571 B1 * 11/2004 Junkers .................. F16B 31/04 29/446

(Continued)

FOREIGN PATENT DOCUMENTS

WO 2015152728 A1 10/2015

OTHER PUBLICATIONS

International Search Report (ISR) dated Jun. 9, 2020 issued in International Application No. PCT/EP2020/054549.

(Continued)

*Primary Examiner* — David B. Thomas
(74) *Attorney, Agent, or Firm* — Holtz, Holtz & Volek PC

(57) ABSTRACT

A bolt tensioning tool is adapted to tension a bolt protruding from a workpiece, and includes a bolt receiving element adapted to be screwed onto the bolt, a nut socket adapted to receive a nut, an axle adapted to exert an axial force on the bolt receiving element, a threaded sleeve arranged to engage the axle and having an internal thread adapted to cooperate with an external thread of the axle such that a relative rotational movement therebetween results in a relative axial displacement between the axle and the threaded sleeve, a supporting sleeve coupled to the threaded sleeve and adapted to selectively bear against the workpiece, and a coupling adapted to connect the nut socket and the supporting sleeve, the coupling is a coupling allowing a limited relative movement between the socket and the sleeve.

15 Claims, 1 Drawing Sheet

(56) References Cited

U.S. PATENT DOCUMENTS

| | | | | |
|---|---|---|---|---|
| 8,539,656 | B2 * | 9/2013 | Katou | B25B 29/02 29/243.529 |
| 9,188,146 | B1 * | 11/2015 | Trautman | F16B 31/04 |
| 9,506,492 | B2 * | 11/2016 | Trautman | F16B 31/043 |
| 9,878,430 | B2 * | 1/2018 | Hohmann | B25B 29/02 |
| 10,364,835 | B2 * | 7/2019 | Trautman | F16B 31/04 |
| 10,850,376 | B2 * | 12/2020 | Komatsu | B25B 29/02 |
| 2014/0020515 | A1 * | 1/2014 | Hohmann | B25B 29/02 81/57.38 |
| 2017/0095915 | A1 | 4/2017 | Jaeger et al. | |
| 2020/0238454 | A1 * | 7/2020 | Hohmann | B25B 23/1422 |

OTHER PUBLICATIONS

Written Opinion dated Jun. 9, 2020 issued in International Application No. PCT/EP2020/054549.

* cited by examiner

BOLT TENSIONING TOOL

TECHNICAL FIELD

The present invention generally relates to tightening of bolts, more particularly to bolt tensioning and a bolt tensioning tool for tensioning a threaded bolt or pin protruding from a workpiece.

TECHNICAL BACKGROUND

When tightening joints using threaded fasteners such as nuts, screws or bolts, a certain clamping force is normally to be achieved in order to provide a required functionality of the joint. Therefore, it is of major importance that fasteners of such joints are tightened to such an extent that it can be ensured that required tightening force levels are reached.

However, using a common power tool for tightening of a bolt a torque is applied to the bolt. Even though power tools used today commonly provide various methods of ensuring that a desired minimum tightening force of a joint is also in fact reached during the tightening process, commonly by measuring the torque applied by the tool and calculating or estimating the corresponding clamp load, uncertainties regarding the actual clamping force reached still exist, e.g. due to the fact that the friction between the fastener and the one or more components being joined can vary substantially from joint to joint.

Hence, although there is a relationship between the applied torque and the resulting clamping force many factors, most importantly friction in the thread (i.e. between nut and bolt) and friction under the nut or bolt head, influence this relationship by introducing a considerable uncertainty as to the actual clamp load achieved in the joint after a certain torque has been applied by means of the power tool. Accordingly, although great care may have been taken with regards to the accuracy of the torque applied for every tightening the result may still be a large scatter in clamp load.

In order to alleviate some of these drawbacks, i.e. in order to obtain a precise and well controlled clamping force in a joint, use of so called bolt tensioning has been proposed. When exercising bolt tensioning, an axial tensioning force is applied to the threaded element (for example a bolt or threaded pin) in order to achieve a desired elongation of the bolt and hence a desired clamp load. This clamp load may be accurately determined from the elongation and the material properties of the bolt. When the desired elongation (i.e. a desired clamping force) is obtained, the threaded element is locked by a nut to maintain the elongated state of the bolt and hence the clamping force.

Such methods are for example commonly exercised for large bolts for tightening flange joints in the oil and gas industry. In such cases, commonly hydraulic tensioners are used. Such tensioners are however associated with drawbacks such as being very slow and requiring a hydraulic pump for operation.

SUMMARY OF THE INVENTION

Accordingly, it would be desirable to provide an improved bolt tensioning tool. In particular, it would be desirable to provide a faster and more convenient tool also suitable for tensioning of smaller bolts. To better address one or more of these concerns a bolt tensioning tool as defined in the independent claim is provided. Preferred embodiments are defined in the dependent claims.

According to a first aspect of the invention a bolt tensioning tool for tensioning a threaded bolt or pin protruding from a workpiece is provided. The tool comprises a bolt receiving element having an internal thread to be screwed onto the threaded bolt or pin, a nut socket adapted to receive a nut to be screwed onto the bolt, an axle coupled to, and adapted to exert an axial force on, the bolt receiving element, the axle comprising an external thread, a threaded sleeve arranged on the axle and having an internal thread adapted to cooperate with the external thread of the axle such that a relative rotational movement between the axle and the threaded sleeve result in a relative axial displacement between the axle and the threaded sleeve and a supporting sleeve connected to the threaded sleeve and adapted to at a first end selectively bear against the workpiece such that a reaction force may be transmitted to work piece, thereby counteracting the axial force exerted on bolt by axle, and a coupling adapted to connect the nut socket and the supporting sleeve, wherein the coupling is a coupling allowing a limited relative movement between the nut socket and the supporting sleeve.

According to the first aspect, the bolt tensioning tool provides an inventive solution to the concerns described above by means of a design enabling not only fast application of an axial force to the threaded element but also a simultaneous locking of the bolt in the tensioned, i.e. elongated state, by means of the nut. Hereby, i.e. by designing the tool such that the comprised part may be automatically rotated in a clever sequence, the tool provides an exact clamp load to the joint in a convenient and user friendly manner. Hence, quality of tightening as well as handling of the tool may be significantly facilitated and simplified compared to what is known in the art. Accordingly, advantages of the invention include that a precise clamp load having a considerably lower scatter than known tools may be delivered to a joint and further that the tool is convenient and easy to use.

When a user utilizes the tool, a rotational movement from for example a motor output shaft is applied to the axle. At an initial, in a sense unloaded step, the axle rotates along with the other described components i.e. the bolt receiving element, nut socket, threaded sleeve and supporting sleeve, where the nut socket is rotated by the supporting sleeve via the coupling there between allowing a limited relative movement. The nut socket, preferably having a shape corresponding to and allowing for a form fit with a nut such as for example a nut having a hexagonal shape, is applied over the nut causing the nut to rotate and be brought into contact with a surface of the workpiece. As soon as the nut has traveled a sufficient distance towards the work piece, the bolt receiving element is screwed onto the threaded element, hereby also establishing a coupling between the axle and the threaded element adapted to exert the tensioning force on the threaded element. During this process, as the nut socket seats against the work piece and can no longer rotate, the supporting sleeve simultaneously moves in a direction towards the work piece and is eventually brought into contact with the contact surface of the workpiece.

As the supporting sleeves in turn comes into contact with the work piece, and as the rotation of the supporting sleeve hence is stopped, a relative rotation between the threaded sleeve and the axle now occurs and in turn results in an axial displacement between the axle now coupled to and adapted to exert an axial force on the bolt and the supporting sleeve, and hereby an axial tensioning force is applied to the bolt. The coupling allowing only a limited relative movement between the nut socket and the supporting sleeve in turn keeps the nut seated against the contact surface of the workpiece, such that the elongating of the bolt (and hence the clamp load) achieved by means of the tensioning force is preserved as the tool is released.

When the desired clamp load is achieved, the bolt tensioning tool may be removed by means of unscrewing the bolt receiving element from the threaded element by reversing the direction of rotation of the axle. Hereby the supporting, or outer, sleeve is released and again free to rotate, thus allowing for the bolt receiving element to be unscrewed from the bolt and the tool to be released. The bolt tensioning tool may in some embodiment comprise a housing, a motor arranged in said housing and an output shaft connected to or comprised by the motor. The rotating movement of this output shaft may be transferred to the axle of the bolt tensioning tool by means of a suitable connection there between. The motor may be an electrical motor or a pneumatic motor, hydraulic drive systems are also conceivable within the scope of the present specification. The bolt tensioning tool may further be a handheld tool or in other embodiments a fixtured tool. The bolt tensioning tool may in some embodiment be adapted to provide a clamp load in the range 0.01-300 kNm, in some embodiments 20-100 kNm.

In some embodiments, the axle and the threaded sleeve may be described as together forming an actuating screw mechanism such that relative rotation between said axle and said threaded sleeve results in relative axial displacement. The nut socket, preferably has a shape corresponding to and allowing for a form fit with a nut such as for example a hexagonal shape. The skilled person however realizes that other shapes are conceivable. The skilled person further realizes that the terms threaded element, bolt and screw are used interchangeably throughout the present specification.

According to one embodiment, the limited relative movement is a limited relative axial and rotational movement and the coupling comprises a resilient element adapted to provide at least said limited relative rotational movement, said resilient element engaging said supporting sleeve and said socket. By resilient element should be understood an element which springs back to shape after being deformed, commonly referenced to as an elastic or flexible element. In some embodiment, the resilient element may be an element biased by the relative rotation between the supporting sleeve and socket, i.e. an element which may be biased by means of an angular offset compared to an initial unloaded state. Further, in some embodiments, the resilient element may be described as an element exerting a spring or biasing force when stretched, or more general storing energy when stretched. This effect is cleverly utilized in the present invention in that the resilient element is stretched during the phase of the tightening when the nut socket has stopped against the work piece surface while the supporting sleeve still travels towards the work piece surface still in rotation, this energy i.e. the resulting force in the element is then utilized during the tensioning phase to continuously rotate the nut socket to maintain the nut in contact with the work piece surface and thus maintain the elongation of the bolt after the tool is removed. I.e. the energy stored is released and provided as a torsional torque as the bolt is stretched and the nut is lifted slightly from the surface allowing for the nut to be turned. In other words, the relative movement between the nut socket and the supporting sleeve in such a case may result in a bias, or tensioning of the spring element, whereby a “tightening” force (i.e. a torsional torque acting in the locking direction of the nut) is applied to the nut socket continuously maintaining the nut against the work piece as the bolt or threaded element is continuously loaded in tension and hence elongated and the nut is hence rotated to follow along with the movement of the elongating bolt in order to stay in contact with the surface surrounding the threaded element, as the axial load on the threaded element is released, the elongation and hence the clamp load is maintained. The allowed relative rotation is however a limited relative rotation as the resilient element will eventually reach a state were no more deformation may occur and the relative rotation will be stopped. The torque provided may also be advantageous in the nut is not loosened as soon as the direction of rotation of the axle is reversed According to one embodiment, the resilient element is a spring element engaging at a first end the socket and at a second end the supporting sleeve. Examples include any type of torsional spring or spiral spring. Hence, as the relative rotation occurs, the spring is tensioned and this stored energy may be utilized to “tighten” the nut, i.e. maintain the nut in contact with the surface surrounding the bolt.

According to one embodiment, a first end of said spring engages said socket and a second end of said spring engages a longitudinal slot in said supporting sleeve. Hereby, not only the relative axial movement is allowed but also the relative axial movement may advantageously be allowed by means of the second end of the spring moving along the slot. The slot may have a longer axial length than the end portion of the spring engages the slot. This allows for the supporting sleeve to travel downwards towards the work piece surface after the nut socket has stopped during the initial phase.

According to one embodiment, the supporting sleeve is axially movable with respect to the bolt receiving element. Hence, the bolt receiving element may for example move away from the workpiece in order to exert the bolt tensioning force on the bolt (or threaded element) while the supporting sleeve bears (i.e. continues to bear) against the workpiece providing support and balancing the force, i.e. handling the resulting reaction forces.

Further, in some embodiments, a relative rotation is allowed between the bolt receiving element and the supporting sleeve. This is advantageous in that rotation of the supporting sleeve may be stopped, while the bolt receiving element is allowed to rotate and vice versa. For example, in one embodiment, the rotation of the supporting sleeve may be stopped as the supporting sleeve bears against the contact surface of the workpiece while a continued rotation of the bolt receiving element may be allowed.

According to one embodiment, the external thread on the axle is oriented in a direction opposite to the direction of rotation of the motor. For example, in the case of a clockwise direction of rotation of the motor (and hence the axle), the thread may be a left hand thread. A rotation provided in a clockwise direction to the axle would in such a case results in a movement of the axle in a direction away from the workpiece. For example, as the rotation of the threaded sleeve is stopped (by means of the supporting sleeve) and relative rotation between the axle and the threaded sleeve therefore occurs, the axle moves in a direction away from the workpiece and exerts a tensioning force on the bolt. The internal thread of the threaded sleeve may in some embodiments also be a thread oriented in a direction opposite to the direction of rotation of the motor.

For example, according to one embodiment, the axle and the threaded sleeve form an actuating screw mechanism. In such a mechanism, the actuating screw mechanism may be a screw mechanism or a roller screw, for example a planetary roller screw, further comprising threaded rollers arranged between the internal thread of the threaded sleeve and the external thread on the axle. This is advantageous in that a screw actuator providing low friction and allowing fast, high precision movement is provided. In such an embodiment, the point where the rotation of the supporting sleeve is stopped (and thus when the outer sleeve starts to move towards a position bearing against the work piece) is determined by the balance between the torque provided by the coupling connecting the nut socket and the supporting sleeve and the torque due to friction in the roller screw.

According to one embodiment, the bolt tensioning tool further comprises an outer sleeve at least partly enclosing the bolt receiving element. This is advantageous for example in that, in some embodiment, relative rotation between the bolt receiving element and the outer sleeve is facilitated.

According to one embodiment, the bolt receiving element further comprises a first member coupled to the axle, a second member comprising the cavity having an internal thread adapted to be screwed onto the threaded bolt or pin and a coupling selectively connecting the first and second member. Hereby, for example relative rotation and/or relative axial movement between the member coupled to the axle (and hence the axle) and the second member (and hence the bolt) may be allowed, thus allowing for decoupling between the bolt and the axle. According to one embodiment, the coupling is a torque-limited coupling between the first member and the second member, such that that a limited rotational torque may be transferred by means of the coupling. This is advantageous for example in that a first rotation may be transferred over the coupling for bringing the nut to bear on the workpiece, and to screw the thread of element onto the screws, i.e. operations providing little or no resistance to rotation and therefore requiring a low(er) torque to be transferred over the interface, whereas when the internal thread of has been screwed onto the bolt, and the resistance to rotation is increased the torque-limited clutch is allowed to slip hence allowing a decoupling between the bolt and the (rotating) axle at this stage.

According to one embodiment, the outer sleeve is coupled to the second member, and the torque-limited coupling is provided between the first member and the outer sleeve.

For example, in one embodiment, the torque limiting coupling is an O-ring provided between the outer sleeve and the first member. Hereby, lower levels of torque may be transferred oven the coupling, since the friction provided by the O-ring is sufficient to transfer the rotational movement over the interface, whereas relative rotation may occur at higher torque levels high enough to overcome the friction provided by the O-ring.

In one embodiment, the bolt tensioning tool further comprises a friction reducing element provided between the bolt and the first portion. This is advantageous for example in that the risk of unwanted locking is reduced. Such a friction reducing element may be for example a small steel ball.

According to one embodiment, the nut socket is arranged to bear against said bolt receiving element via a bearing, for example a ball bearing, such that said nut socket is rotationally decoupled from said bolt receiving element.

Hereby, it is ensured that the nut socket is only rotated by means of the supporting sleeve, and not affected by the rotation of the bolt receiving element. Embodiments are conceivable where the nut socket bears directly against the bolt receiving element.

According to one embodiment, the coupling between the nut socket and the spring element comprises a one-way coupling such that a first end of the spring element is engaged by the nut socket when the socket rotates in a first direction and not engaged by the nut socket when the socket rotates in a second opposite direction. This is advantageous in that the removal of the tool from the joint is facilitated, where otherwise there would prevail a significant risk of loosening the nut when reversing the tool and thus losing some or all of the clamp load.

According to one embodiment, the bolt tensioning tool further comprises means for measuring the axial force exerted on the bolt. Such means may include a strain gauge mounted on a suitable position on the bolt tensioning tool, a load cell or force gauge mounted on the tool or any other type of sensor suitable for measuring a quantity indicative of the force, and hence clamping load, applied. Such means for measuring may preferably be arranged to measure the respective quantity of interest on and/or in a component subjected to the axial tensioning force. For example, due to the tool applying a tensioning force, the means for measuring may be arranged in, or connected to, one or more of the components of the tool subjected to the tensioning load, i.e. the clamp load, such as for example the axle or the roller screw.

In some embodiments, indirect measurements such as measurements of the power delivered to the motor or similar may be utilized. Further examples include measurements of torque, angle, oil pressure or current control.

According to one embodiment, the means for measuring the axial force comprise an ultrasonic measurement device. Although the methods mentioned in the foregoing all have their advantages, they are all subjected to a chain of mechanical and electrical measurements that cause errors and lower accuracy and precision of the tensioning. However, since the tool is subjected to the full clamp load, more direct measurement is possible using ultrasonic measurements. Hereby a lot of error in clamp load measurement may be avoided.

Ultrasonic measurement on bolts in order to determine the clamp force produced during bolt tightening is known. When using such methods, ultra-sonic pulses are transmitted into the bolt by means of a suitable transducer and the response time, often referred to as the time of flight, is monitored. The time of flight corresponds to the length of the bolt. Hence, any measured increase in the time of flight corresponds to an increase of the length of the bolt, and thus, of the clamp force in the bolt. Problems associated with such ultra sound methods however include difficulties to establish a good enough contact between the ultra-sonic meter and the bolt, commonly leading to an undesired need to use special screws and/or special probes on the tool.

In one embodiment, such an ultrasonic device may therefore be arranged inside the tool. This is advantageous for example in that such special screws and/or special probes on the tool as known from prior art solutions may be avoided thus facilitating measurements as well as increasing accuracy. For example, due to the tool applying a tensioning force, the device may be arranged in, or connected to, one or more of the components of the tool subjected to the tensioning load, i.e. the clamp load. In other words, the ultrasonic device may for example be arranged to transmit and/or measure the time of flight of an ultrasonic wave in one or more of the components of the tool which are subjected to the tensioning, i.e. clamp, load.

According to one embodiment, the ultrasonic measurement device comprises an ultrasonic transducer and is adapted to measure time of flight of an ultrasonic wave in a component subjected to the axial tensioning force. Hereby, the change in length and thus the clamp load may be determined. In such an embodiment, the component(s) on which measurement are to be performed may be easily adapted to increase measurement accuracy for example by means of providing flat surface between on/at the ultrasonic wave may be reflected.

In one embodiment, measurements are performed on the axle. In another embodiment, measurements are performed on the roller screw.

In one embodiment, the measurement device may be adapted to measure the amount of relaxation occurring when the nut is subjected to the full load by means of monitoring of the clamp load signal.

According to a second aspect of the present invention a bolt tensioning mechanism for use with a power tool is provided. Such a bolt tensioning mechanism may in some embodiment be a separate bolt tensioning mechanism adapted to be attached ton outgoing axel of a power tool, such as an outgoing motor axle. In such an embodiment, the bolt tensioning mechanism may further comprise suitable means for providing a connection to the axle of the tool. Examples include a suitable socket, a chuck or similar. Objectives, advantages and features of the bolt tensioning mechanism conceivable within the scope of the second aspect of the invention are readily understood by the foregoing discussion referring to the first aspect of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be better understood through the following illustrative and non-limiting detailed description of preferred embodiments, with reference to the appended drawing, on which.

All figures are schematic, not necessarily to scale and generally only show parts which are necessary in order to elucidate the invention, wherein other parts may be omitted or merely suggested.

DETAILED DESCRIPTION

Figure 1:
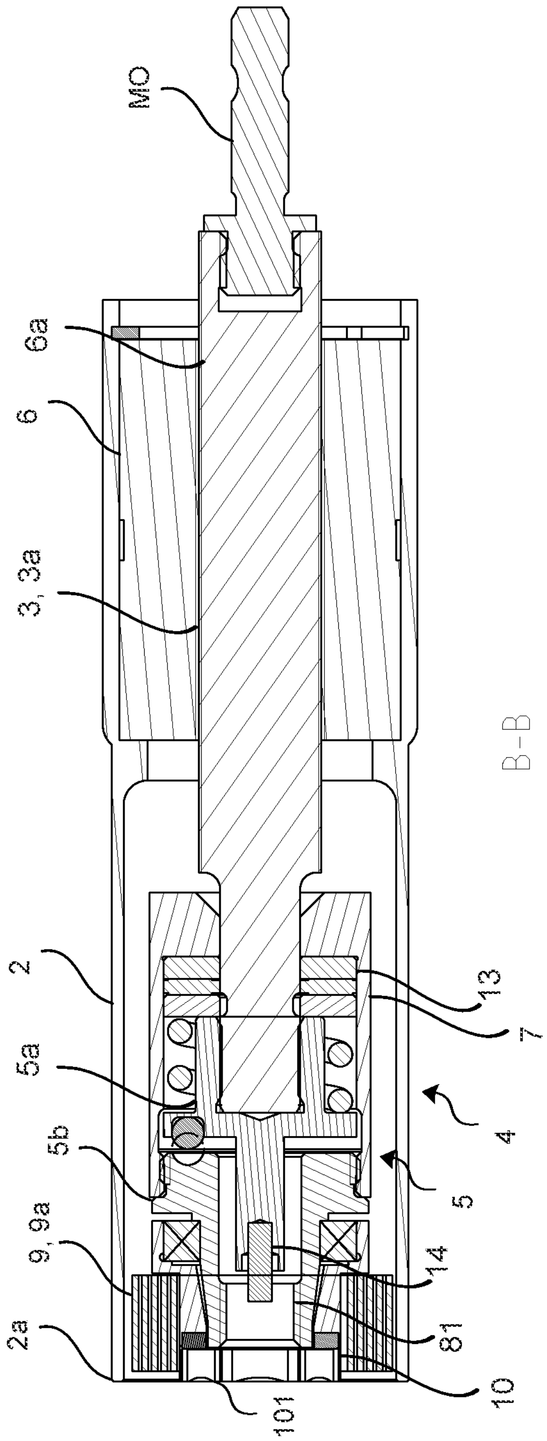
FIG. 1 is a cross sectional view, along axle, of a bolt tensioning tool according to one embodiment in more detail.
Figure 2:
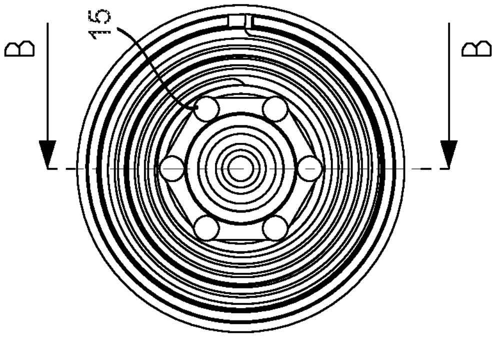
FIG. 2 is a cross sectional view, normal to axle, of a bolt tensioning tool according to one embodiment in more detail.

A bolt tensioning tool according to one embodiment of the invention is shown in FIGS. 1 and 2. The illustrated exemplary embodiment is adapted for tightening of a M10 screw, where the desired clamp load lies in the range 30-40 kN.

The tool comprises a supporting sleeve 2 adapted at a first end 2*a* to bear against the surface of the workpiece and a nut socket 10 adapted to receive a nut to be screwed onto the bolt and arranged to bear against a bolt receiving element 5 having an internal thread to be screwed onto the threaded bolt to provide a connection between the tensioning tool and the bolt. Further, an axle 3 is coupled to, and adapted to exert an axial force on, the bolt receiving element and comprises an external thread (not shown). A threaded sleeve 6 comprising an internal thread 6*a* for cooperation with the external thread, hereby forming a screw type actuator, is in turn connected to the supporting sleeve 2.

The illustrated embodiment further comprises means MO for applying a rotational movement to the axle 3, in the illustrated embodiment in the form of an intermediated axle MO which may be connected for example to an output shaft of a motor (not shown). A spring element 9*a*, in the illustrated embodiment a torsional spring 9*a* in the form of a winded steel wire is arranged between the nut socket 10 and the supporting sleeve 2.

FIG. 1 shows a number of the components in a cross sectional view of an assembled state of the bolt tensioning tool. As can be seen from FIG. 1, most components are arranged inside (or surrounded by) the surrounding sleeve 2, and the axle 3 extends through the supporting sleeve 2 from the threaded sleeve 6 to the bolt receiving element 5. The torsion spring 9*a* is arranged on and attaches to the nut socket 10 which in turn bears against the bolt receiving element 5.

In the illustrated embodiment, the bolt receiving element 5 comprises a first element 5*a* connected by suitable means to the axle, in the illustrated the first element 5*a* is fixedly coupled to the axle, a second element 5*b* comprising the cavity having internal threads and hence being adapted to be attached to the bolt or threaded element and an outer sleeve 7 surrounding, or enclosing, the first and second element. Further, a torque-limiting coupling is arranged between elements 5*a* and 5*b* to selectively connect them, such that that a limited rotational torque may be transferred between the elements 5*a*, 5*b*. In the illustrated embodiment, the outer sleeve 7 is fixed (i.e. fixedly coupled) to the second element 5*b*, and the torque-limited coupling (not shown) is provided between element 5*a* and the outer sleeve 7, for example in the circumferential groove in element 5*a*. In the exemplary case shown in FIG. 1, the torque limiting coupling is an O-ring (not shown) provided between elements 5*a* and sleeve 7.

Additional components illustrated include an axial bearing 13 provided between element 5*a* and a rear surface of sleeve 7 and a friction reducing element 14 provided between the bolt (not shown) and a portion of the bolt receiving element 5.

FIG. 1 also shows the torsion spring 9*a* comprising a first end for engaging the nut socket and a second end for engaging the supporting sleeve 2.

The nut socket 10 comprises a first surface 101 adapted to bear against a surface of the workpiece surrounding the bolt and a second opposite surface forming part of a supporting heel for the torsion spring 9*a*. Further, the upper part of the socket is adapted to engage the end of the spring by means of what may be described as a one-way coupling in that the upper portion comprises an asymmetric heel (a radial projection arranged on a circumferential surface of said nut socket) adapted to engage the first end of the torsion spring when the socket rotates in a first (in this case clockwise) direction and not engage the end when rotation in the opposite direction occurs.

In the cross section shown in FIG. 2, the rollers 15 of the planetary roller screw formed by the axle 3, the threaded sleeve 6 and a number of threaded rollers 15 arranged between the internal thread of the threaded sleeve 6 and the external thread 3*a* on the axle 3 are shown. The illustrated embodiment comprises six rollers 15.

The functionality of an exemplary embodiment of the bolt tensioning tool will now be described In general, a rotational movement from a motor output shaft is applied to the axle 3, in the illustrated embodiment by means of additional axle MO, and in an unloaded situation, for example when driving the tool without engaging the nut and/or bolt, axle 3 rotates along with the other described components i.e. the bolt receiving element 5, outer sleeve 7, the nut socket, the threaded sleeve and the supporting sleeve 2 and substantially no relative rotation occurs there between.

When the tightening operation, more particularly the tensioning operation is started, the nut socket, preferably having a shape corresponding to and allowing for a form fit with a nut such as for example a hexagonal shape, is applied over the nut thereby causing the nut to rotate and be brought into contact with a contact surface of the workpiece and the bolt receiving element is screwed onto the threaded element protruding from the work piece, hereby establishing a coupling between the tool and the threaded element necessary in order to enable exertion of the tensioning force on the threaded element.

As the nut socket is initially seated against the work piece, the socket will during a phase of the process bear against the contact surface while the supporting sleeve still remains at a slightly elevated position as compared to the contact surface and continues to rotate freely.

Up to this stage, the rotation is synchronous between all components (except the nut socket). However, as the bolt receiving element 5 and more particularly the second, or front, part **5*b* of the bolt receiving element is completely screwed onto the bolt the torque transferred over the torque-limiting coupling (not shown), e.g. an O-ring, increases and the coupling slips and the front part 5*b* and hence the thereto connected sleeve 7 become decoupled from the first element 5*a* and remain stationary. The axle 3 and first element 5*a*, the threaded sleeve 6 and the supporting sleeve 2** however continue to rotate.

More particularly, the supporting sleeve 2 now rotates against the resistant of torsion spring **9*a*, the torsion spring 9*a* being arranged between the now still standing nut socket and the (rotating) supporting sleeve 2. However, the allowed relative rotation is a limited relative rotation as the spring only allows or a certain amount of deformation and the rotation of the supporting sleeve 2** is stopped.

Consequently, the rotation of the threaded sleeve 6 is stopped due to the coupling between sleeve 6 and supporting sleeve 2. This happens as the torque due to the resistance to rotation provided by the spring element **9*a* is larger than the torque provided by the frictional resistance in the planetary roller screw. As the rotation of the threaded sleeve is stopped and relative rotation between the axle which continuous to be rotated by the motor and the threaded sleeve therefore occurs, initially the sleeve 2 is brought into contact with the contact surface of the workpiece and thus forms a support counteracting the tensioning force about to be applied, i.e. handling the reaction forces. The axial movement of the supporting sleeve 2 necessary to achieve this contact is achieved due to the external thread on the axle 3 being oriented in a direction opposite to the direction of rotation of the motor (in the illustrated embodiment the external thread is a left hand thread and the direction of rotation is clockwise). Hence, a rotation provided in a clockwise direction to the axle 3 (the threaded sleeve 6 being locked) results in a movement of the supporting sleeve 2** in a direction towards the workpiece.

The step bringing the sleeve 2 into contact with the surface is followed by the actual tensioning of the bolt, as after the support sleeve 2 is seated against the contact surface and therefore obviously cannot move further in a direction towards the workpiece, relative rotation between the axle and the threaded sleeve now instead (again due to the orientation of the thread, results in axial displacement of the axle 3 in a direction away from the contact surface, hereby exerting an axial tensioning force on the bolt.

During the tensioning phase, as the bolt is tensioned the nut arranged on the bolt is consequently lifted off the contact surface as the bolt extends. The spring element **9*a* however keeps the nut locked/seated against the contact surface of the workpiece due to the bias/spring force created as the sleeve 2** was rotated with respect to the nut socket. This force continuously "pulls" on the nut, and therefore brings or even hold the nut seated stage against the surface.

When the desired clamp load is achieved, the bolt tensioning tool may be removed. This is achieved by reversing the direction of rotation of the motor, in this case into a counterclockwise rotation. Initially, this causes the tension over the planetary roller screw to be released which in turn implies that the rotation of the nut socket 10 is stopped. This since the supporting sleeve 2 is no longer pressed towards the workpiece surface and is hence allowed to rotate (i.e. the rotation is not locked anymore). But, since the nut socket 10, is arrange on the nut, the socket 10 cannot rotate and accordingly, it must be provided an engagement between the connecting element, in this case the spring **9*a*, and the nut socket 10 allowing for an unlimited relative rotation in this opposite, counterclockwise direction. This is why the coupling in the illustrated embodiment comprises a design providing the one-way functionality described in the foregoing such that a first end of the spring element is engaged by the nut socket when the socket rotates in a first direction and not engaged by the nut socket when the socket rotates in a second opposite direction. As mentioned above, in the illustrated embodiment this is accomplished by a number of protrusions, or shoulders, arranged along a periphery of the nut socket. The shape of these protrusions is such that the first end of the spring 9*a* when rotation in a clockwise direction engages a surface extending in substantially radial direction and thus allowing the spring 9*a* to engage the shoulder in rotation and in rotation in a counterclockwise direction slides along an inclined portion of said shoulder thus allowing for a rotation of the supporting sleeve 2 in a counterclockwise direction without engagement between the socket 10 and the spring 9*a*. Hereby, the bolt receiving element 5 which is screwed onto the thread of the bolt, may be rotated and the tool 1 may eventually be removed. As the bolt engaging element 5 is completely unscrewed from the bolt, the nut socket 10** may also be removed.

While the invention has been illustrated and described in detail in the drawings and foregoing description, such illustration and description are to be considered illustrative or exemplary and not restrictive; the invention is not limited to the disclosed embodiment. The skilled person understands that many modifications, variations and alterations are conceivable within the scope as defined in the appended claims.

Additionally, variations to the disclosed embodiments can be understood and effected by those skilled in the art in practicing the claimed invention, form a study of the drawings, the disclosure and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. A bolt tensioning tool adapted to tension a threaded bolt or pin protruding from a workpiece, the tool comprising:

a bolt receiving element having an internal thread adapted to be screwed onto the threaded bolt or pin;

a nut socket adapted to receive a nut to be screwed onto the bolt, an axle coupled to, and adapted to exert an axial force on, the bolt receiving element, the axle comprising an external thread;

a threaded sleeve arranged to engage the axle and having an internal thread adapted to cooperate with the external thread of the axle such that a relative rotational movement between the axle and the threaded sleeve result in a relative axial displacement between the axle and the threaded sleeve;

a supporting sleeve coupled to the threaded sleeve and adapted to at a first end selectively bear against the workpiece such that a reaction force may be transmitted to work piece, thereby counteracting the axial force exerted on bolt by axle; and a coupling adapted to connect the nut socket and the supporting sleeve, wherein the coupling is a coupling allowing a limited relative movement between the nut socket and the supporting sleeve.

2. The bolt tensioning tool according to claim 1, wherein the limited relative movement is a limited relative axial and rotational movement and wherein the coupling comprises a resilient element adapted to provide at least the limited relative rotational movement, the element engaging the supporting sleeve and the socket.

3. The bolt tensioning tool according to claim 2, wherein the resilient element is a spring element engaging at a first end the socket and at a second end the supporting sleeve.

4. The bolt tensioning tool according to claim 3, wherein a first end of the spring engages the socket and wherein a second end of the spring engages a longitudinal slot in the supporting sleeve.

5. The bolt tensioning tool according to claim 3, wherein the coupling between the nut socket and the spring element is a one-way coupling such that a first end of the spring element engages the nut socket when the socket rotates in a first direction and disengages the nut socket when the socket rotates in a second, opposite direction.

6. The bolt tensioning tool according to claim 1, wherein the external thread on the axle is oriented in a direction opposite to a direction of rotation of the motor.

7. The bolt tensioning tool according to claim 1, wherein the axle and the threaded sleeve form an actuating screw mechanism, and wherein the actuating screw mechanism is a planetary roller screw further comprising at least one threaded roller arranged between the internal thread of the threaded sleeve and the external thread on the axle.

8. The bolt tensioning tool according to claim 1, further comprising an outer sleeve at least partly enclosing the bolt receiving element.

9. The bolt tensioning tool according to claim 1, wherein the bolt receiving element further comprises:

a first member coupled to the axle;

a second member comprising a cavity having an internal thread adapted to be screwed onto the threaded bolt or pin and a coupling selectively connecting the first and second member.

10. The bolt tensioning tool according to claim 9, wherein the coupling is a torque-limited coupling between the first member and the second member, such that that a limited rotational torque may be transferred by the coupling.

11. The bolt tensioning tool according to claim 10, wherein the outer sleeve is coupled to the second member, and wherein the torque-limited coupling is provided between the first member and the outer sleeve.

12. The bolt tensioning tool according to claim 1, wherein the nut socket is arranged to bear against the bolt receiving element.

13. The bolt tensioning tool according to claim 12, wherein the nut socket is arranged to bear against the bolt receiving element via a bearing, such that the nut socket is rotationally decoupled from the bolt receiving element.

14. The bolt tensioning tool according to claim 1, further comprising means for measuring the axial force exerted on the bolt.

15. The bolt tensioning tool according to claim 14, wherein the means for measuring the axial force comprises an ultrasonic measurement device.

* * * * *